Nov. 26, 1963   R. T. CARRICO ETAL   3,111,860
CONSTANT MESH GEAR TRANSMISSION
Filed Feb. 6, 1962   7 Sheets-Sheet 1

INVENTORS
RALPH T. CARRICO
CHARLES RUSSELL FORD
J. D. HALBROOKS
MICHAEL BEYERSDORFER
EDWARD KEITH PERCIFIELD
BY Herbert Q. Weintraub
ATTORNEY Nov. 26, 1963    R. T. CARRICO ETAL    3,111,860
CONSTANT MESH GEAR TRANSMISSION
Filed Feb. 6, 1962    7 Sheets-Sheet 4

INVENTORS
RALPH T. CARRICO
CHARLES RUSSELL FORD
J. D. HALBROOKS
MICHAEL BEYERSDORFER
EDWARD KEITH PERCIFIELD
BY Herbert A. Weintraub
ATTORNEY Nov. 26, 1963 R. T. CARRICO ETAL 3,111,860
CONSTANT MESH GEAR TRANSMISSION
Filed Feb. 6, 1962 7 Sheets-Sheet 6

INVENTORS
RALPH T. CARRICO
CHARLES RUSSELL FORD
J. D. HALBROOKS
MICHAEL BEYERSDORFER
EDWARD KEITH PERCIFIELD
BY *Herbert A. Weintraub*
ATTORNEY INVENTORS
RALPH T. CARRICO
CHARLES RUSSELL FORD
J. D. HALBROOKS
MICHAEL BEYERSDORFER
EDWARD KEITH PERCIFIELD BY Herbert A. Winters
ATTORNEY 3,111,860
CONSTANT MESH GEAR TRANSMISSION
Ralph T. Carrico, Charles Russell Ford, J. D. Halbrooks, Michael Beyersdorfer, and Edward Keith Percifield, all of Indianapolis, Ind., assignors to Indus Corporation, Indianapolis, Ind., a corporation of Indiana
Filed Feb. 6, 1962, Ser. No. 171,395
4 Claims. (Cl. 74—372)

This invention involves a power transmission for changing gear ratios or speeds between a power intake and a power output. Gears are employed to be in constant mesh one with another to achieve different speed ratios, including a reverse drive, between that intake and output. Different combinations of gears are selectively, frictionally interconnected with an output shaft by means of a shiftable control shaft. The invention resides in the structure herein described which produces that operation.

A primary object of the invention is that no gears are required to be shifted for any operation whereby use of any and all gear shifting mechanism is avoided and there is no gear clashing. The overall weight of the transmission is quite light and compact.

The invention lends itself for use in innumerable installations. For instance, one installation is in a transportation cart on golf courses over hills and hollows with much starting and stopping, and with driving speeds up to thirty miles per hour. The inventive structure is adaptable for drives in the automotive industry, in boats, farm machinery, and machinery in general.

Figure 1:
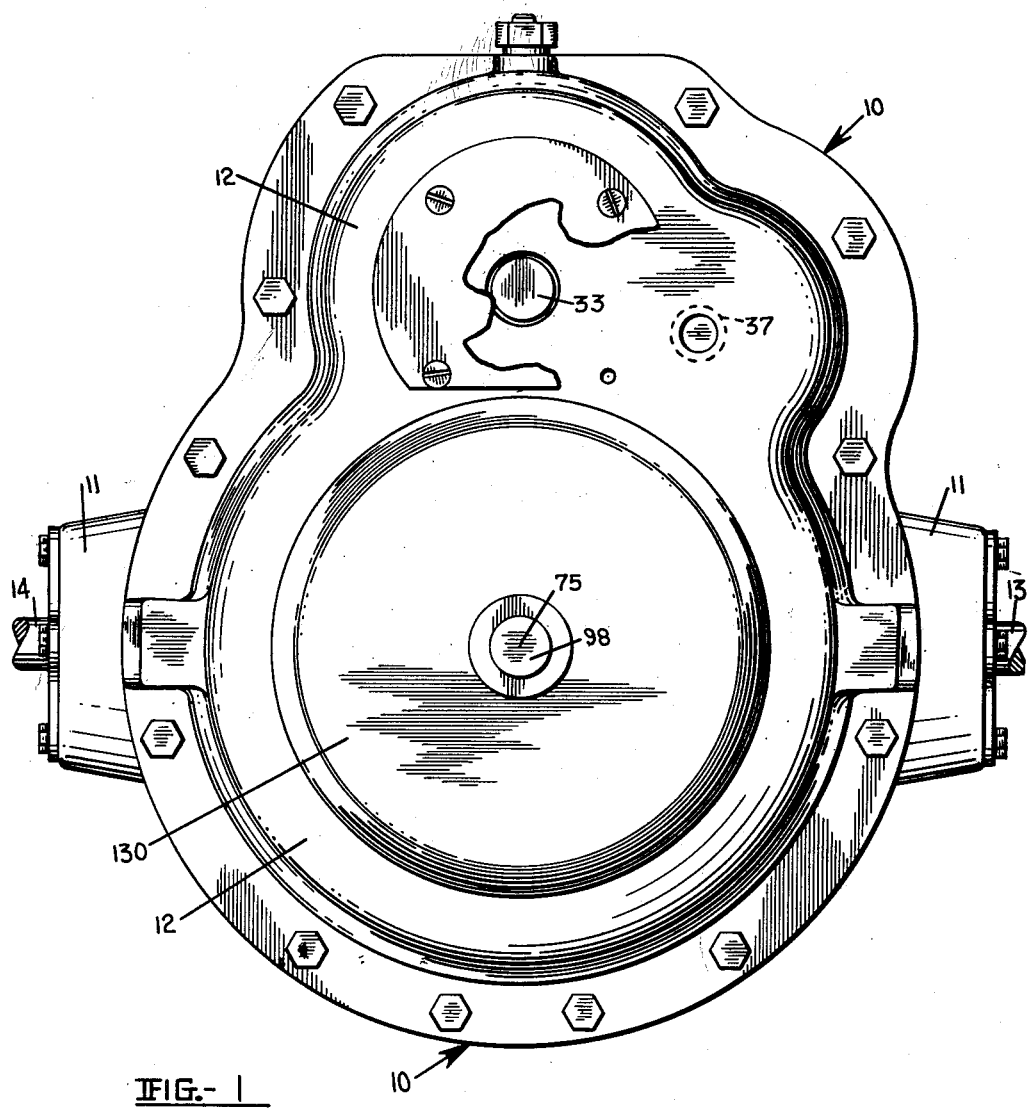
Figure 2:
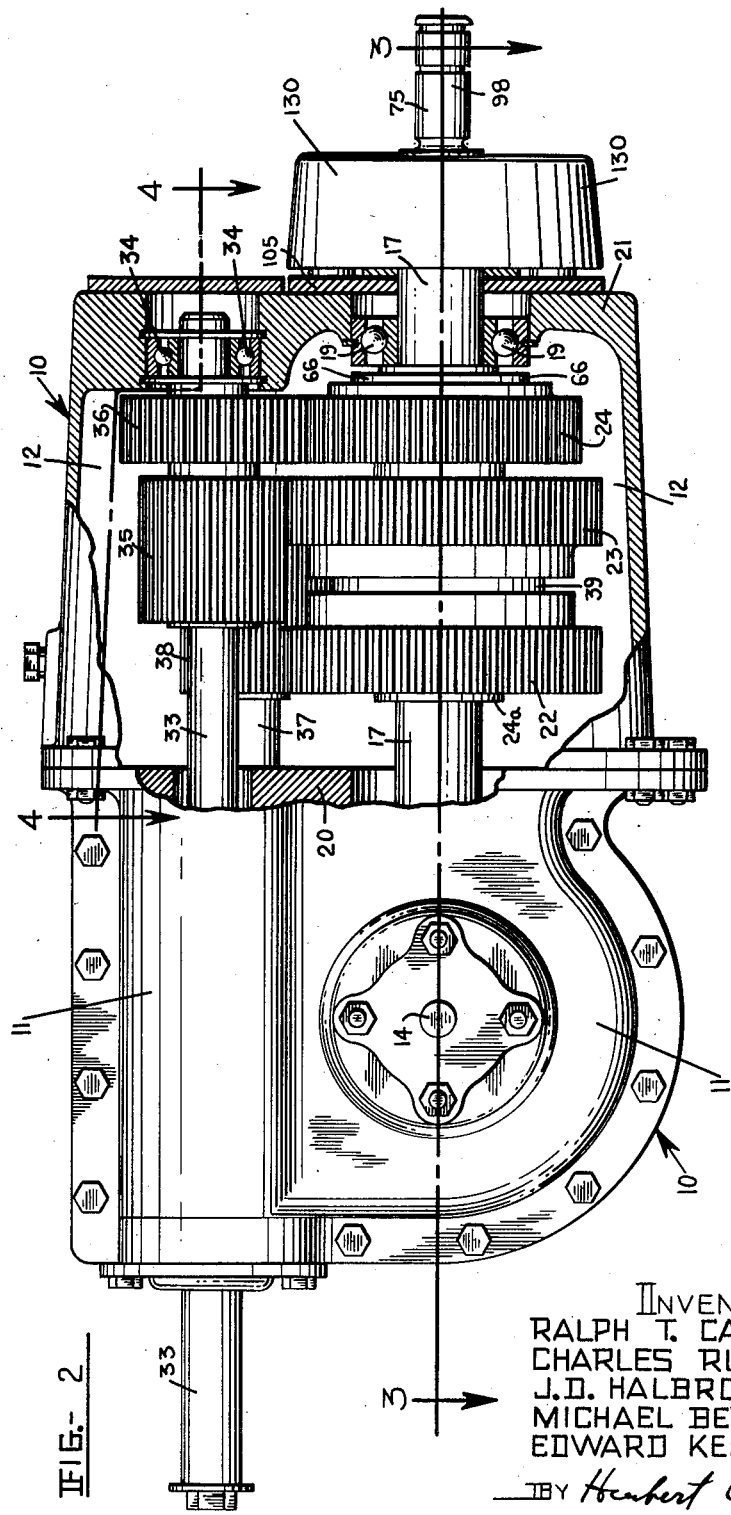
Figure 3:
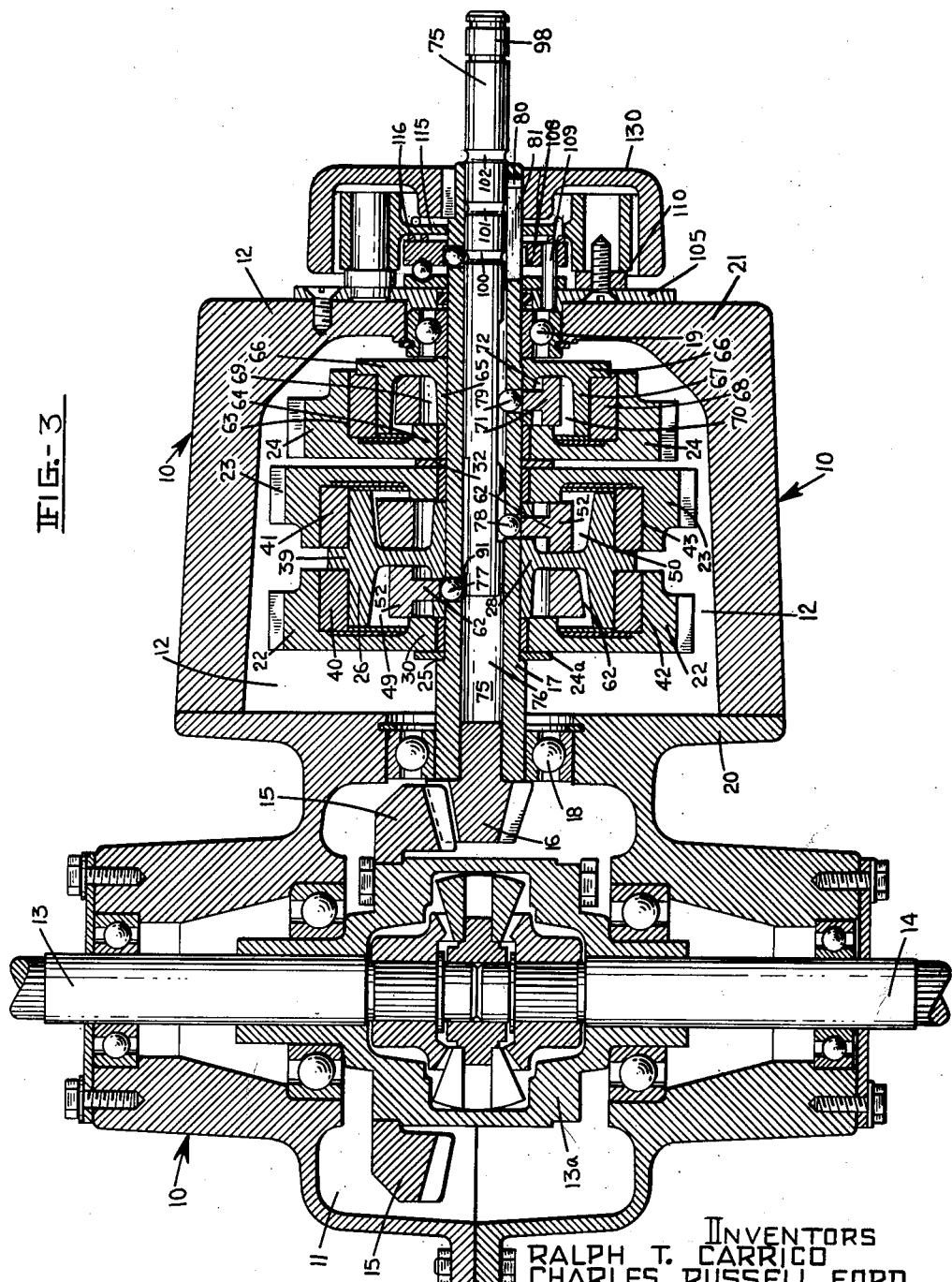
Figure 4:
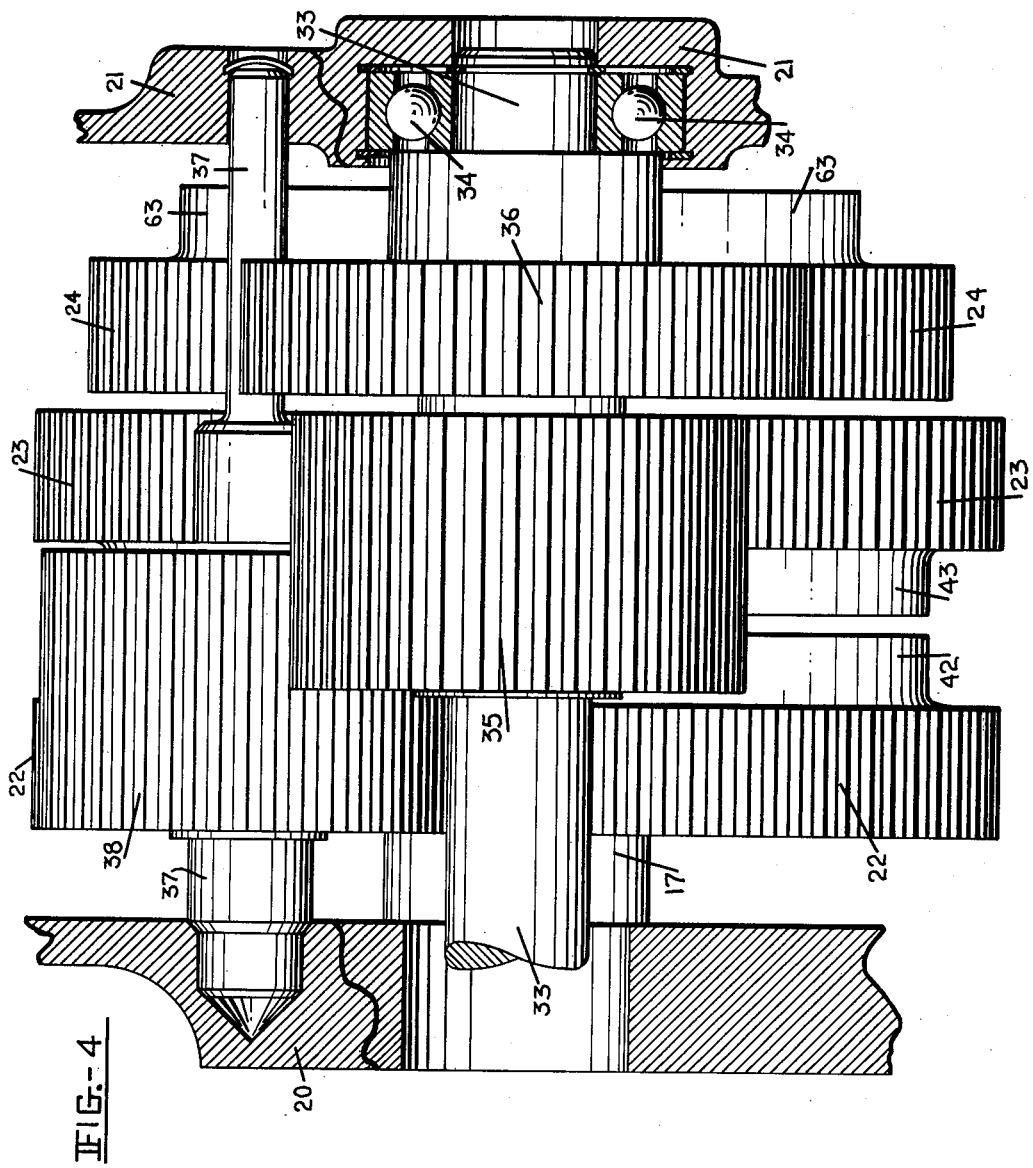
Figure 5:
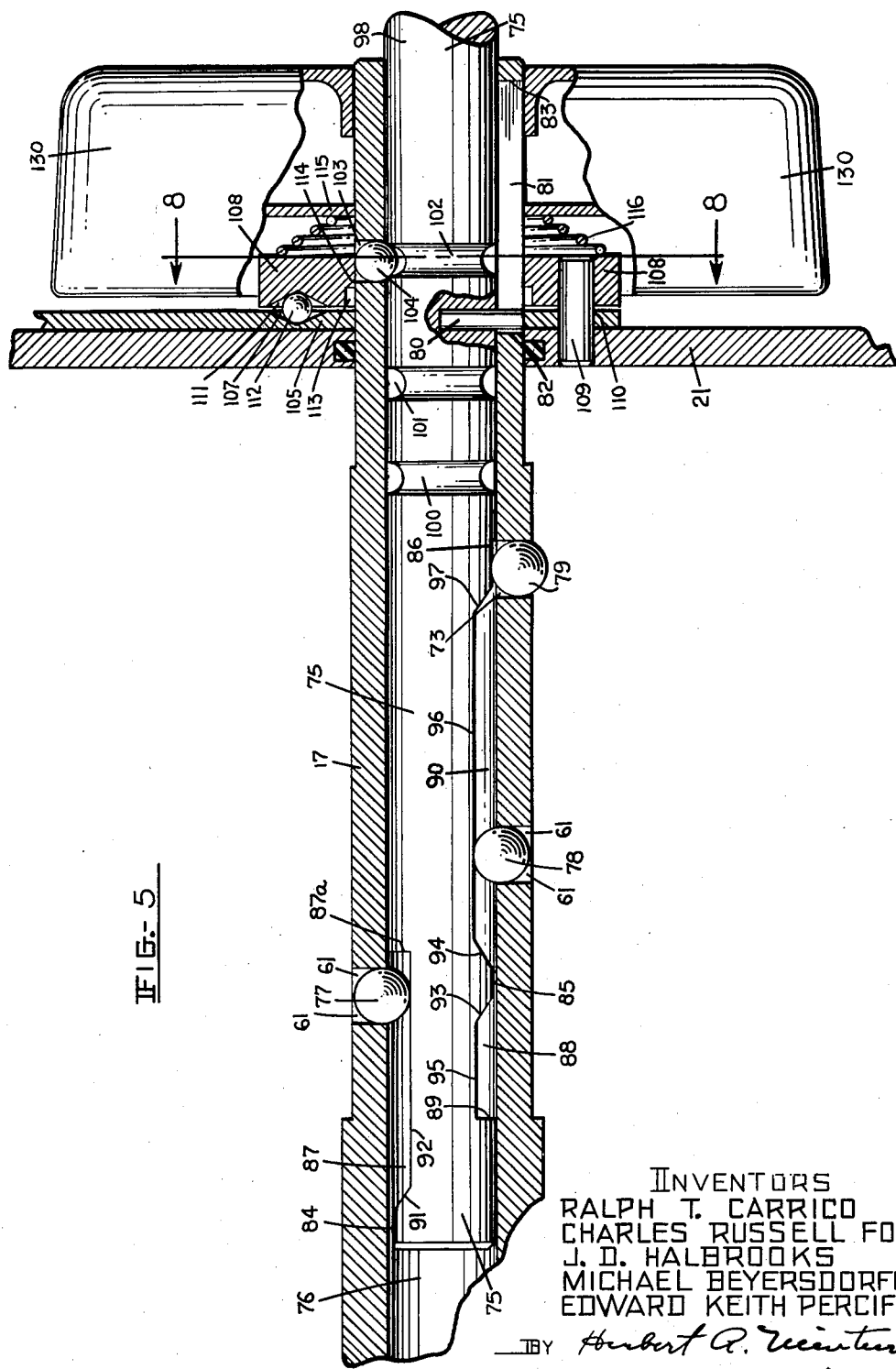
Figure 6:
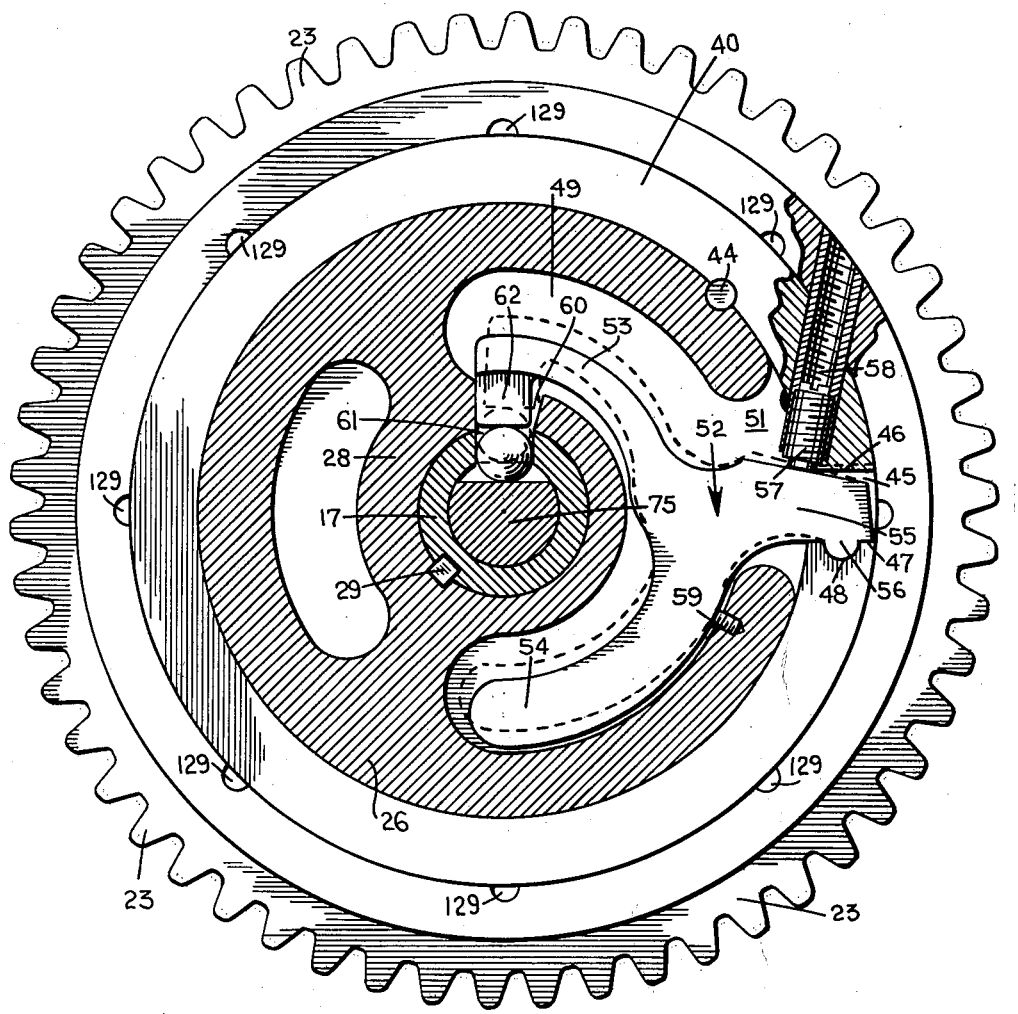
Figure 7:
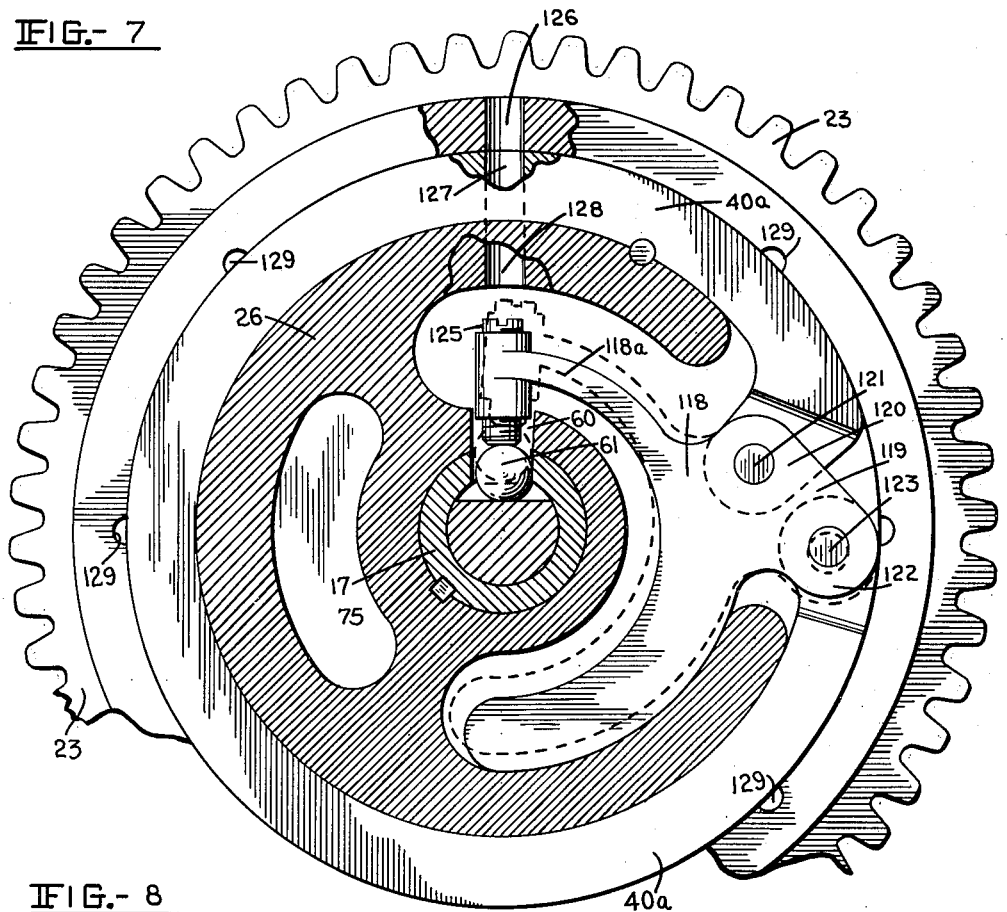
Figure 8:
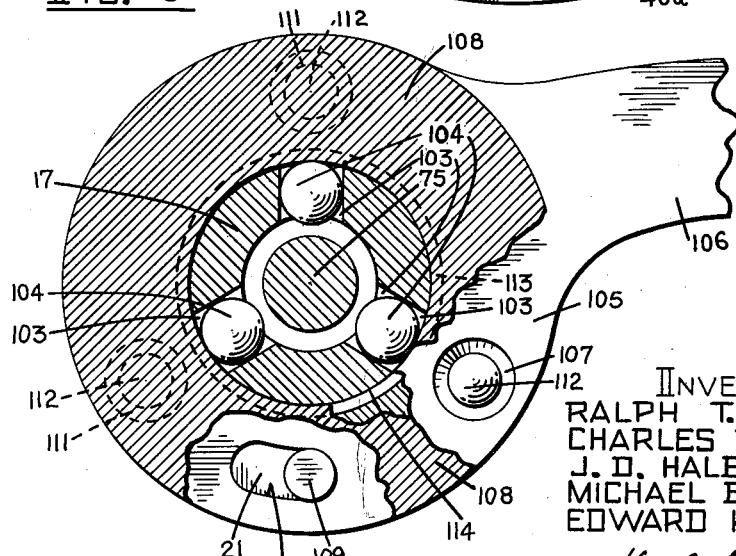

The invention is herein described and illustrated in one selected form of an automotive drive as an example without limitation thereto, with reference being made to the drawings, in which FIG. 1 is a view in end elevation of the structure;
FIG. 2 is a view in side elevation and partial section;
FIG. 3 is a view in horizontal longitudinal section on the line 3—3 in FIG. 2;
FIG. 4 is a gear train detail in partial section on the line 4—4 in FIG. 2;
FIG. 5 is a detail in axial section through the drive and speed change shafts on an enlarged scale;
FIG. 6 is a detail in vertical section of a gear-to-driveshaft interconnecting mechanism;
FIG. 7 is a view in detail in vertical section of the mechanism shown in FIG. 6, in modified form; and
FIG. 8 is a detail in section of a speed control shaft interlocking mechanism.

For convenience in manufacturing and servicing, a housing generally designated by the numeral 10 is made in several parts defining an axle drive compartment 11 and a gear assembly compartment 12.

A conventional differential assembly 13a is mounted in the compartment 11, FIG. 3. Drive axles 13 and 14 extend oppositely from the differential 13a externally of the housing 11. The differential assembly 13a carries a ring gear 15 in constant mesh with a bevel gear 16 which is fixed to a tubular shaft 17 presenting the bevel gear 16 within the compartment 11. This shaft 17 extends across and is journaled in bearings 18 and 19 in opposite end walls 20 and 21 of the compartment 12.

A series of gears are tentatively mounted, one gear after another on the tubular shaft 17 within the compartment 12. In the present illustration these gears consist of a reverse gear 22 adjacent the wall 20; a low gear 23; and a high gear 24 adjacent the wall 21.

The gear 22 is limited in travel toward the wall 20 by any suitable means herein shown as by a washer 24a around the shaft 17 abutting a shaft shoulder 25. A shoe retainer 26 with a radial section generally T-shaped has a hub 28 fixed to the tubular shaft 17 by any such means as a key 29, FIG. 6. This hub 28 is adjacent the hub 30 of the gear 22 thus retaining the gear 22 in running abutment with the washer 24a. The hub 31 of the gear 23 is in running abutment with the shoe hub 28 and is thus retained by a washer 32 around the shaft 17. The gear 24 abuts the washer 32 and is thus positioned by the bearing 19.

Reference is now made to FIGS. 2 and 4. A power input shaft 33 which passes through the compartment 11 extends across the compartment 12 to be supported by a rear bearing 34 carried in the wall 21 above the bearing 19. An axially elongated gear 35 is fixed to the input shaft 33 and is in constant mesh with the low gear 23. A second gear 36 is also fixed to the shaft 33 and it is in constant mesh with the high gear 24.

A jackshaft 37 is rotatably supported by its ends by the walls 20 and 21 to one side and somewhat below the input shaft 33. An axially elongated gear 38 is fixed to the jackshaft 37 and meshes constantly by one portion of its length with the reverse gear 22 and by its other portion with a portion of the input shaft gear 35. With these gear intermeshings, the input shaft may rotate and simultaneously turn all three gears 22, 23, and 24 around the shaft 17 without imparting any driving connection with the shaft 17.

In describing the selective drive connections between the input shaft 33 and the output shaft 17, reference is made primarily to FIGS. 3, 4, 5, 6, and 7.

The shoe retainer 26 has a central, external, annular rib 39. A shoe 40 surrounds the retainer 26 on one side of the rib 39 and a like shoe 41 surrounds the retainer 26 on the other side of the rib 39. Each gear 22 and 23 is recessed to form opposing drums 42 and 43 into which the shoes 40 and 41 respectively extend. The shoes 40 and 41 are each keyed to the retainer 26 by any suitable means, herein shown as by a key 44 extending transversely between a shoe and to retainer, FIG. 6, the key being partly in the retainer and partly in the shoe, so as to prevent travel circumferentially of the shoe around the retainer. The shoes normally have a running fit between them and the cylindrical surface of the drums 42 and 43.

The shoes 40 and 41 are, in effect split bands, each having an opening 45 between opposing ends 46 and 47, FIG. 6. One shoe end 47 is provided with a central semi-cylindrical groove 48 transversely thereacross.

The retainer 26 has cavities 49 and 50 opening from opposite sides. Each cavity 49 and 50 has a peripheral opening 51. In each cavity 49 and 50 is placed a member 52 resembling a wishbone with forked legs 53 and 54 and a median extending head 55. The legs 53 and 54 straddle the hub 28 and the head 55 extends through the retainer openings 51 and between the shoe ends 46 and 47. One side of the head 55 carries a transverse rib 56 which rockingly rides in the groove 48. A screw 57 is carried by the shoe adjacent the end 46 and is axially directed toward the head 55 from its side opposite to the side carrying the rib 56. Access to this adjusting screw 57 is had through the diagonal bore 58 through the shoe and gear.

The leg 54 of the member 52 is limited in its travel by striking the side of the cavity 49, but preferably by striking an adjustable limit screw 59 interposed between the cavity side and the leg.

The retainer hub 28 has a radial hole 60 therethrough axially aligned with a hole 61 through the tubular shaft 17. A post 62 extends from the leg 53 freely into the hub hole 60. The structure so far described relates to the reverse and low gears 22 and 23.

The high gear 24, FIG. 3, is recessed to have an internal drum 63. Between the hub 64 of the gear 24 and the bearing 19, is a spacing hub 65 of a single shoe retainer 66. The hub 65 is fixed to the shaft 17. This retainer 66 has a drum 67 around which is wrapped a split shoe 68 which is a counterpart of the shoes 40 and 41, but smaller in diameter. The periphery of the shoe 68 is in sliding fit with the drum 63.

A wishbone member 69 is carried within the cavity 70 of the retainer 66 and is identical in shape and structure with the members 52. A post 71 extends from the leg 72 of the member 69 freely into the hub 65 directed toward a hole 73 in the shaft 17. The shoe 68 is keyed to the retainer 66 exactly the same as on the shoes 40 and 41 to their retainer.

Selective rocking of any one of the members 52 and 69 by pressure outwardly from the shaft 17 will expand a particular shoe and thereby drivingly interconnect, the reverse, low, or high gears 22, 23, 24 with the output shaft 17, as will later be more fully described.

These members 52 and 69 are rocked and released by means of a shifter shaft 75 slidingly retained in the bore 76 of the tubular shaft 17 selectively pushing balls 77, 78, and 79 against posts 62 and 71.

Referring to FIG. 5, the shifter shaft 75 is constrained to limited axial shifting in the bore 76 by means of a pin 80 in the present instance fixed to the shaft 75 and entering by a portion into the slot 81 between the slot ends 82 and 83, whereby the shaft 75 must rotate with the shaft 17. The shifter shaft 75 is provided with three lands 84, 85, and 86; a recess 87 extending along the shaft 75 from the land 84 to an abutment 87a; a recess 88 to the left of the land 85, as viewed in FIG. 5, extending from the land 85 to an abutment 89; and a recess 90 between the land 85 and the land 86.

The spacing along the shifter shaft 75 of the land 84, 85, and 86 is arranged in accordance with the spacing apart of the two holes 61, and the hole 73, in turn determined by the location of the two posts 62, and the post 71. The diameter of the balls 77, 78, and 79 are selected to have the outer sides of the balls approximately tangential to the outer cylindrical surface of the shaft 17 when the balls rest in the recesses 87, 88, and 90 with substantially half of each ball within its respective shaft holes 61, 61, and 73.

The land 84 has an inclined surface 91 leading thereto from the floor 92 of the recess 87. The intermediate land 85 has inclined surfaces 93 and 94 on opposite sides leading thereto from the floors 95 and 96 of the recesses 88 and 90 respectively. The land 86 has an inclined surface 97 leading thereto from the floor 96 of the recess 90.

The shifter shaft 75 may be shifted within the tubular shaft 17 by any suitable means (not shown) engaging an exposed end 98. In FIG. 3, the shaft 75 is shifted to the extreme possible right hand position as viewed in that FIG. 3. In this position, the inclined surface 91 has travelled under the ball 77 and pushed it outwardly in the hole 61 causing the ball 77 to push against the post 62 to rock the wishbone member 52 within the reverse gear 22; spread apart the shoe 40; thereby drivingly connect the gear 22 with the shaft 17; and hold the ball 77 in that position with the land 91 brought under the ball.

Assuming that the driving shaft 33, FIGS. 2 and 4, is rotating, a drive is set up from the shaft 33, through the gear 35; gear 38; and gear 22, thus turning the shaft 17 in the same direction as the shaft 33 turns. Accordingly, the pinion gear 16 turns the ring gear 15, which in turn, through the differential 13a, drives the shafts 13 and 14. The drive thus set up is denoted as the reverse drive.

It is to be noted that to have achieved this reverse drive, the land 85 has been carried to the right of the ball 78, and the ball 78 rides freely in the recess 88 as in FIG. 3. Further in this reverse drive situation, both the balls 78 and 79 remain inoperative in respect to the low and high gears 23 and 24.

The reverse drive is discontinued by moving the shifter rod 75 to the left and the low gear drive is achieved by pressing the inclined surface 93 over the ball 78 to bring the land 85 thereover, and push the ball 78 outwardly in the hole 61 against the post 62 of the wishbone 52 mounted in the low gear 23, thereby expanding the shoe 41 into driving engagement with the drum 43. This sets up a low gear drive from the shaft 33, through the gear 35; the gear 23; shaft 17; the pinion gear 16; and the shafts 13 and 14 through the differential 13a. In this low gear drive, the ball 77 is in part in the recess 87.

The shaft 75 is pushed to the left to set up a high speed drive. The ball 78 drops back into the recess 90 and the inclined surface 97 pushes out the ball 79 and the land 86 comes thereover. The ball 79 thus has pushed the post 71 to rock the member 69 and spread the shoe 68 into driving engagement with the drum 63 of the gear 24. Under these conditions, the high gear drive is had from the shaft 33 through the gear 36; gear 24; shaft 17; pinion 16, ring gear 15; differential 13a; and shafts 13 and 14.

It is to be seen that only one of the gears 22, 23, and 24 may be connected at a time drivingly with the shaft 17. Between each of the three drive connections, the recesses 87, 88, and 90 are sufficiently long, together with the spacing apart of the balls 77, 78, and 79, to permit the balls to enter those recesses. Any conflict between those three drive connections is avoided.

Means are provided to releasably retain the shaft 75 in any one of the three drive positions. Such means comprises the following structure: the shaft 75 has three spaced apart, annular grooves 100, 101, and 102 near the right hand end of the shaft as viewed in FIG. 5. These grooves 100, 101, and 102 are centered in their spacing apart equal to the distances required to shift the lands 78, 85, and 86 to center over their respective balls 77, 78, and 79. The tubular shaft 17 has a hole 103 therethrough. A ball 104 is dropped through the hole 103. The radius of curvature of each of the grooves 100, 101, and 102 allows the ball to enter sufficiently therein to restrain the shaft 75 against axial travel. When the ball 104 is thus partially entered into any one of the three grooves, the shaft 75 is not movable, providing the ball is held against travel outwardly from the hole 103. The outer side of the ball 104 is approximately tangential with the outer surface of the shaft 17 when the ball 104 is entered in a groove, as indicated in FIG. 5. Without being held when entered in a groove, the shaft 75 may be moved in either axial direction by causing the ball 104 to pop out of contact with the margins of the grooves. Preferably, the radius of curvature of the grooves is less than that of the ball 104.

A device for retaining the ball 104 in groove contact and for releasing it is best illustrated in FIGS. 5 and 8. A plate 105 is rockably carried by the shaft 17 against the wall 21 and has an extending lever 106 to rock it. A plurality of conical cavities 107, herein shown as three in number, enter the plate from its side removed from the wall 21. A retainer plate 108 receives the shaft 17 freely therethrough and is held against revolving about the shaft 17 by a pin 109 which slidingly passes through the plate 108, through a slot 110 in the rockable plate 105 and fixedly into the wall 21. This retainer plate 108 carries three conical cavities 111 centered over the cavities 107. A ball 112 is placed between the plates 105 and 108, one ball 112 between each of the three opposing cavities, the wider or base ends of which are directed one toward the other. The plate 108 has a counterbore 113 therearound on its side directed toward the plate 105. The shaft 17 is provided with three holes 103 and a ball 104 in each. These balls 104 are normally retained in their said tangential positions with the outer side of the shaft 17 by means of the plate 108 sliding thereover, as in FIG. 8, by the central bore wall 114 which rides on the shaft 17. A conical compression spring 116 bearing by one end against a member 115 held in fixed spaced distance from the wall 21, bears by its other end against the plate 108 normally retaining the balls 112 centered in the respective opposing cavities 107, 111. The counter-bore 113 in this position of the plates 105 and 108 is located to one side of the holes 103. When the shaft 75 is to be shifted, the lever 106 is rocked to cause the conical walls of its cavities 107 to ride over the balls 112 in turn causing the balls 112 to ride over the conical walls of the cavities 111 in the plate 108. In this action, the plate 108 moves axially of the shaft 17, compressing the spring 116 and the plate counterbore 113 shifts over the holes 103 sufficiently to allow the balls 104 to be lifted in the holes 103 by reason of margins of the grooves 100, 101, and 102 bearing on sides of the balls 104 to enter them in the counterbore 113 sufficiently to permit the shaft 75 to be shifted as desired. The plate 108 may not be returned to its normal position, FIG. 5, until the shaft 75 travels enough to bring a groove under the balls 104, whereupon the spring 116 will move the plate 108 and bring the bore 114 over the balls 104 again. Then the lever 106 is released.

A structure for spreading the shoes 40, 41 and 68 for shoe-to-drum engagement has been described in one particular form as illustrated in FIG. 6. A slightly modified form achieving the same result is shown in FIG. 7.

In this modified form, a wishbone member 118 is provided with a head 119 which is pivotally connected by one side 120 by a pin 121 to one end of the shoe 40a and by the other side 122 by a pin 123 to the other end of the shoe 40a, the center of the pin 121 being at a less distance from the center of the gear 23 than is the center of the pin 123. Rocking of the wishbone member 118 thus exerts a toggle action tending to spread apart the shoe ends when the leg 118a of the member 118 is rocked away from the shaft 17. The leg 118a has a post 124 extending toward the hole 60 and is provided with a central adjusting member 125 screw-threadedly, axially passing through the post 124 into the path of the ball 61 which is shifted by the shaft 75. Access to the member 125 is through bores 126, 127, and 128 respectively in the gear 23, shoe 40a, and shoe retainer 26.

All of the elements in the chamber 12 may be made of metal and will run in a bath of oil in this chamber. To facilitate lubrication between the shoes and the gear drums, the drums are preferably provided with a plurality of spaced apart, transversely extending oil grooves 129. While a brake drum 130 is shown attached to the shaft 17, the details of the brake mechanism are not herein illustrated nor described, since they do not per se enter into the inventive structure. Obviously the shaft 33 may be driven from any desirable power source.

Therefore, while we have described and illustrated in detail the one best form of our invention, it is obvious that structural changes may be incorporated therein without departing from the spirit of the invention, and we therefore do not desire to be limited to that precise form beyond the limitations which may be imposed by the following claims.

We claim:
1. In a constant mesh gear transmission having
   a tubular shaft; a plurality of gears revolubly mounted side by side on said shaft;
   a power input shaft;
   gears fixed on said input shaft engaging certain of said gears on said tubular shaft; and a slide shaft longitudinally shiftable within said tubular shaft and having elevations spaced therealong shiftably registrable with tubular shaft openings;
   the combination of a drum carried by each of said tubular shaft carried gears;
   a cylindrical shoe in each of said drums and split to have two opposing ends;
   a shoe retainer for each of and around which said shoes wrap;
   said retainer extending around and being fixed to said tubular shaft; and having a cavity therein opening adjacent said shoe ends;
   means fixing said shoes to said retainers in each instance;
   a wishbone member having a head extending into said cavity opening adjacent said shoe ends, and a pair of spaced apart legs extending from said head within said cavity;
   means retaining said head in association with said shoe ends to space apart said ends upon rocking of one of said legs in a direction away from said tubular shaft; and
   a member entering each of said tubular shaft openings and extendible by travel of a slide shaft land thereagainst urging said member against said one leg in turn spreading a shoe into frictional gripping contact with its drums.

2. The structure of claim 1 in which
   said slide shaft is constrained to axial travel in said tubular shaft and is fixed to rotate therewith.

3. The structure of claim 1 in which there is
   a jackshaft;
   a gear fixed to the jackshaft and in constant mesh with one of said tubular shaft gears other than one of said certain gears and also with one of said gears fixed on said input shaft.

4. The structure of claim 1 in which there is
   means positively retaining said slide shaft in any one of said selected registrations of a land with a tubular shaft opening comprising
   spaced apart annular grooves around said slide shaft, one groove for each of said lands;
   a ball entering a hole through said tubular shaft to enter partially into any one of said grooves carried by the slide shaft into registry with said hole, the radius of a groove being less than the radius of said ball;
   a sleeve slidably mounted on said tubular shaft and having a central bore normally retaining the ball in the tubular shaft hole and in a slide shaft groove;
   a wall having a fixed face parallel with an opposing face of said sleeve;
   each of said faces having matching pairs of conical bores entering therein;
   a spacing ball carried between each pair of opposing conical bores;
   a spring normally urging said sleeve toward said wall face with said spacing ball in each instance centered with its corresponding pair of face bores;
   said sleeve having a counterbore at the end of its said bore adjacent said wall face, and
   means for rotating said sleeve around said tubular shaft thereby rolling said spacing balls on the walls of said conical bores spacing apart said two faces against the pressure of said spring and moving said counterbore in relation to said tubular shaft hole to permit said groove entered ball to be expelled from the groove upon axial travel of said slide shaft by entering said counterbore.

References Cited in the file of this patent
UNITED STATES PATENTS

| | | |
|---|---|---|
| 462,738 | Rivett | Nov. 10, 1891 |
| 890,210 | Bullard | June 9, 1908 |
| 893,684 | Whitcomb | July 21, 1908 |
| 1,941,161 | Wise | Dec. 26, 1933 |
| 3,067,626 | Doerries et al. | Dec. 11, 1962 |

FOREIGN PATENTS

| | | |
|---|---|---|
| 1,150,917 | France | Aug. 19, 1957 |
| 566,070 | Italy | Aug. 20, 1957 |